No. 747,493. Patented December 22, 1903.

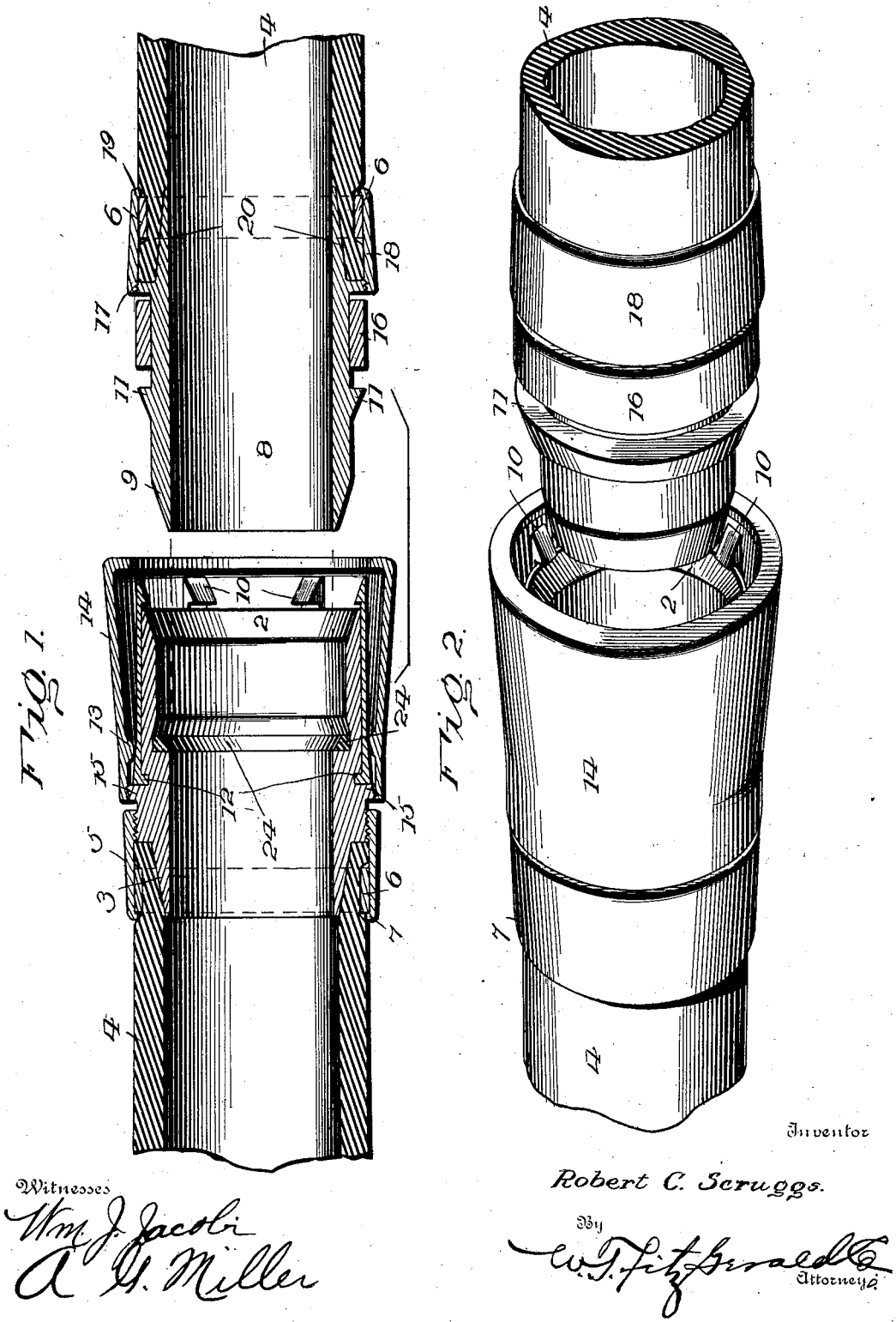

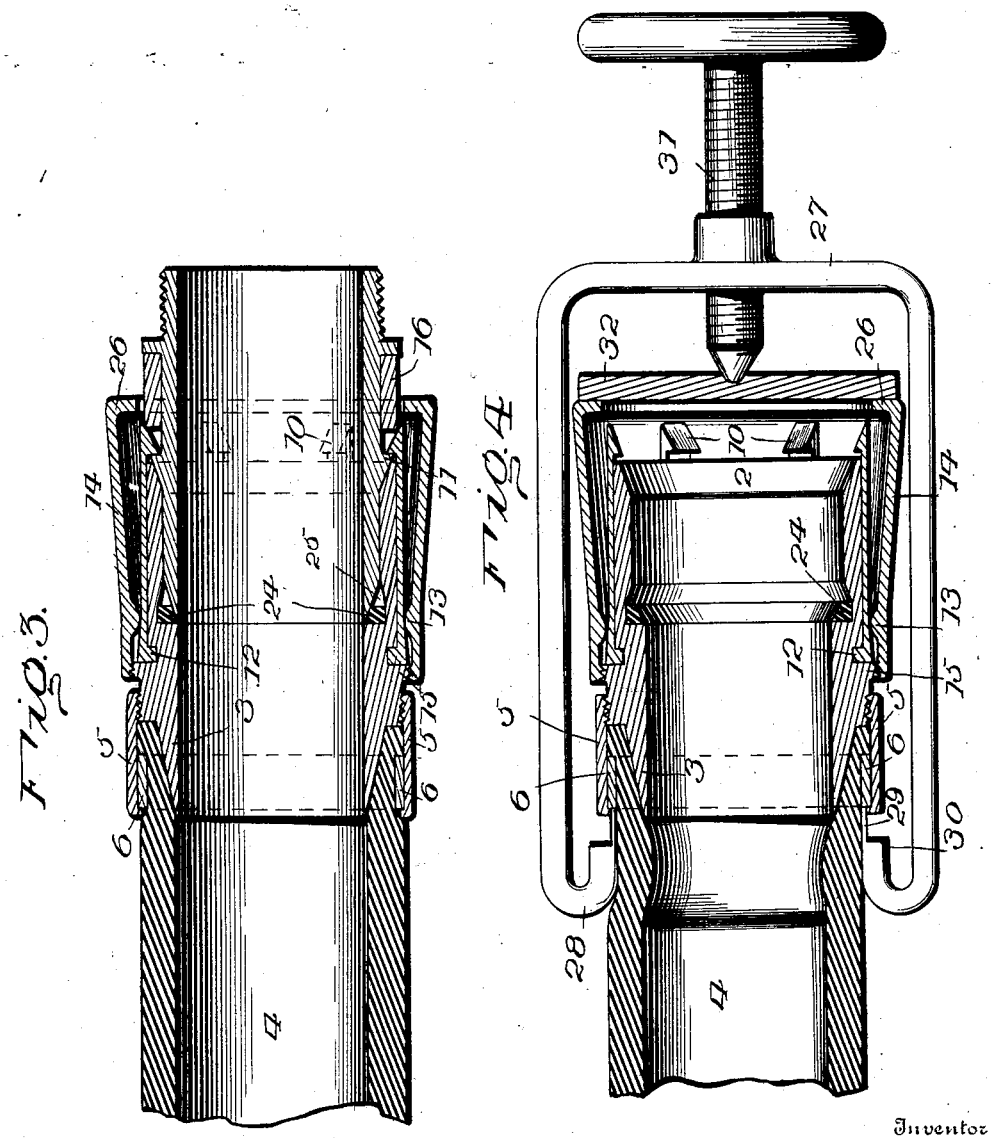

UNITED STATES PATENT OFFICE.

ROBERT C. SCRUGGS, OF BIRMINGHAM, ALABAMA, ASSIGNOR, BY DIRECT AND MESNE ASSIGNMENTS, TO STEPHEN W. WALLACE, R. McCONNELL, AND JOHN M. CARTWRIGHT, OF BIRMINGHAM, ALABAMA, AND GEORGE A. OLIVER AND F. G. BREWSTER.

SWIVEL-COUPLING.

SPECIFICATION forming part of Letters Patent No. 747,493, dated December 22, 1903.

Application filed November 1, 1901. Serial No. 80,790. (No model.)

*To all whom it may concern:*

Be it known that I, ROBERT C. SCRUGGS, a citizen of the United States, residing at Birmingham, in the county of Jefferson and State of Alabama, have invented certain new and useful Improvements in Swivel-Couplings; and I do hereby declare the following to be a full, clear, and exact description of the invention, such as will enable others skilled in the art to which it appertains to make and use the same.

My invention relates to what I have for convenience termed my "self-acting" or "automatic" swivel-coupling; and my object is to provide means for instantly connecting two ends of a hose or pipe in such a manner that it will not only prevent all leakage at the point of union, but will also permit one section of the hose to be rotated or partially rotated, as commonly incident to the use thereof, a very important and valuable desideratum.

A further object is to so construct the end of my coupling contiguous to the hose or pipe with which it is designed to couple that the end of the hose or pipe will be reliably engaged and secured in operative union with the coupling proper.

Other objects and advantages will be made fully apparent from the following specification considered in connection with the accompanying drawings, in which—

Figure 1 is a longitudinal section of my improved flexible hose-coupling. Fig. 2 is a perspective detail view thereof, showing the parts in an uncoupled condition. Fig. 3 is a longitudinal section showing the parts illustrated in Fig. 1 connected together in their operative position. Fig. 4 is a longitudinal section of the female portion of my coupling, illustrating the manner of connecting the end of the hose thereto.

For convenience of description I shall designate the essential features of novelty of my invention and coöperating accessories by numerals, and, referring to the numerals upon the drawings, 1 indicates the tubular body or female portion of my invention, which is provided upon its outer end with the beveled rim 2 and upon its inner end with the exteriorly-tapered flange 3, which is designed to enter the end of the flexible pipe or hose 4 commonly used by fire departments, said pipe being held upon the tapered end 3 by means of the ferrule or thimble 5, the inner edge of which is threaded and adapted to engage a threaded seat provided upon the member 1.

It may be stated at this time that the end of the flexible hose 4 is very tightly drawn in position by means of the collar or band 6, which fits snugly upon the outer side of the hose and is drawn tightly inward by means of the inwardly-directed shoulder or lip 7, formed upon the ferrule 5.

In Fig. 4, as I shall hereinafter specifically set forth, I have illustrated the tool employed to force the band 6 inward, so that the end of the flexible hose will be compressed thereby and forced tightly in engagement with the tapered seat or flange 3. The inwardly-beveled edge 2 is provided in order to facilitate the introduction of the tubular member 8, the inner end of which is exteriorly beveled, as indicated by the numeral 9, and in order to hold said parts in union with each other I provide a plurality of locking-springs 10, carried by the member 1 and designed to ride over the annular swell or ledge 11, formed at the proper point upon the exterior of the member 8.

It will be understood that the lockingsprings 10 may be secured in any preferred way to the member 1, though I prefer to accomplish this result by providing suitable longitudinally-disposed grooves or seats in the exterior of the body portion 1, where it is desired to locate a spring, the said groove or recess being of sufficient size to receive said spring, and thus prevent it from having lateral movement. In order that said springs may not move longitudinally, I so form each of said springs that the inner ends thereof will have the inwardly-directed lug or terminal 12, a suitable recess being formed in the body portion 1 to receive said lug, as will be more clearly observed by reference to Fig. 1 and other sectional views presented in the drawings. I obviate the necessity of riveting or providing a set-screw to hold each individual spring in place by forming a swell or annual boss 13 upon the inner surface of the housing 14, and since each spring is so formed that its inner end is increased in thickness said annular boss will engage the inclined surface of the spring, when said housing is turned home and secured in its operative position by the inner threaded end thereof engaging with the threaded collar 15, which latter is integrally formed upon the member 1 at a proper point, so as to insure that the ferrule 5 and the inner end of the housing 14 will be disposed contiguous to each other. By this construction, just described, for holding the plurality of locking-springs 10 in their respective operative positions it will be seen that any of said springs may be readily removed and replaced by first removing the housing 14, when said springs will drop out of their respective seats and may be restored or removed if broken or for other reasons.

Upon the exterior of the male portion or member 8 I provide the movable collar 16, the office of which is to ride against the inclined faces of all of the locking-springs and spread or move the free ends thereof outward out of engagement with the ledge 11, and thus disengage the said members 8 and 1 from each other. The collar 16 is loosely disposed in position and is limited in its outward movement by the annular flange or rib 17, which is threaded upon its outer surface to receive the contiguous threaded end of the ferrule 18, which latter is designed to perform a similar office to that of the ferrule 5, inasmuch as it is designed to engage the anchoring-band 6 by means of the inwardly-directed lip or flange 19, and thereby insure that the end of the flexible hose 4 will be reliably anchored in position after it has been disposed upon the beveled seat formed upon the exterior of the outer end 20 of the member 8.

The space between the ledge 11 and the annular rib 17 is of sufficient extent to permit the collar 16 to loosely play between said parts and thereby permit the collar to be moved against said rib and thus afford ample room for the hooked ends of the members 10 to snap over the ledge 11 and thus engage the member 8 and hold it against casual displacement. By this means my improved coupling may be readily uncoupled. In order to prevent leakage, I provide an annular seat or groove within the member 1, in which I dispose the gasket 24, of rubber or the like, the position of said gasket being such that it will engage the beveled face 9 of the inner end of the member 8. By a proper location of the gasket 24 it will be seen that said gasket will be engaged by said beveled end 9 and so compressed in its seat that it will be securely wedged in between the members 8 and 8 and thereby insure that an increase of pressure within the pipes will only tend to make a tighter joint, since the gasket 24 will be forced into the triangular space 25, formed by the beveled face 9, and a contiguous bevel provided as part of the seat for the gasket 24.

In Fig. 3 the relative position of all the parts when connected together is clearly set forth. The housing 14 and the ferrules 5 and 18, as well as other parts, may be neatly polished or plated, so as to insure a neat and attractive appearance of my coupling. The outer edge of the housing 14 is preferably directed inward to provide the annular flange 26, designed to inclose and protect from view the locking-springs 10 and other parts.

In Fig. 4 I have illustrated the manner of connecting my coupling to the flexible hose with which it is designed to coöperate. In order to draw the end of the pipe 4 upon the beveled seat 3, I provide the instrument or tool comprising the substantially U-shaped body portion 27, the extreme ends of which are provided with the inwardly-directed hook-terminals 28, each having a reduced extension 29 and a corresponding shoulder 30. I first slip over the end of the hose 4 the anchoring-band 6, and then move said end upon the seat 3 so far as practicable, it being understood that the ferrule 5 or 18, as the case may be, is unscrewed from its seat and left loosely disposed over said hand. The inwardly-directed extensions 29 are then brought to bear upon the outer edge and upon opposite sides of the band 6, and the band is then forced inward by means of the clamping-screw 31, which extends through a suitable seat in the central part of the U-shaped body portion, while the inner end of said screw is preferably conical and designed to fit a centrally-disposed aperture or recess in the disk or plate 32, disposed across the open end of the housing 14. After the band has been forced inward sufficiently to draw the end of the hose upon the seat 3 the ferrule 5 or 18 is then turned home upon its threaded seat, which insures that the inwardly-directed lip 7 will engage the band 6 and hold it in its adjusted position, when the clamping instrument comprising the U-shaped body portion 27 may be removed. In like manner the flexible hose may be released from its tapered seat 3 by again using said instrument to force the band 6 inward sufficiently to permit the ferrule to be unscrewed, and as this operation of separating the hose from the end of the coupling is obviously clear further description is deemed unnecessary.

It will be understood that while my improved swivel-coupling is primarily designed for use in connection with fire-department hose, it may be, as herein specified, very easily adapted for all the various uses for which such a coupling may be desirable.

The various portions may be formed of any preferred material and of any desired size, and while I have described the preferred construction and combination of parts it will be understood that I desire to comprehend in this application all substantial equivalents and substitutes that may be considered to fall fairly within the scope and purview of my invention.

It will be further observed that a very important result follows the use of the construction herein presented, inasmuch as the locking-springs 10, as indicated in Fig. 1 and other views, will freely move upon the vertical face of the rib or ledge 11, and thus permit the coupling to be freely turned at this point without danger of any leakage following, inasmuch as the rubber gasket 24 is so tightly compressed between the inner end of the member 8 and the gasket-seat that the escape of the fluid within the pipes will be absolutely prevented.

Believing that the advantages and manner of using my improved automatic swivel-coupling will be made fully apparent from the foregoing specification considered in connection with the accompanying drawings, further reference to the details is deemed unnecessary.

Having thus fully described my invention, what I claim as new, and desire to secure by Letters Patent, is—

1. In a swivel-coupling of the character described, the male and female portion; means for connecting said portions to their respective hose-section, one of said portions being provided with an annular ledge and the other with a plurality of locking-springs removably inserted and frictionally held at one end and engaged between their ends by said ledge and designed to ride over and engage said ledge, and a housing inclosing said springs, said housing having upon its inner surface an annular boss, as set forth.

2. In a swivel-coupling of the character described, the combination with a member having longitudinally-disposed grooves in its outer wall and recesses at the inner end thereof; springs having lugs removably held in said recesses; a housing having threaded engagement with said member and having an annular internal boss to engage said springs near their lug ends, and a coupling member having an annular ledge and a movable collar adjacent thereto substantially as herein shown and described.

3. In a swivel-coupling of the character described, the combination with a member having longitudinally-disposed grooves in its outer wall and recesses at the inner end thereof; springs having lugs removably held in said recesses; a housing having threaded engagement with said member and having an annular internal boss to engage said springs near their lug ends, and a coupling member having an annular ledge and a movable collar adjacent thereto; a ferrule and an annular rib thereon, substantially as herein shown and described.

In testimony whereof I affix my signature in presence of two witnesses.

ROBERT C. SCRUGGS.

Witnesses:
W. H. MOSS,
R. A. MAYNARD.